United States Patent [19]
Michaels et al.

[11] Patent Number: 5,622,046
[45] Date of Patent: Apr. 22, 1997

[54] MULTIPLE IMPINGING STREAM VORTEX INJECTOR

[75] Inventors: Robert S. Michaels, Scottsboro; Ben F. Wilson, Huntsville, both of Ala.

[73] Assignee: The United States of America as represented by the Secretary of the Army, Washington, D.C.

[21] Appl. No.: 521,381

[22] Filed: Aug. 28, 1995

[51] Int. Cl.[6] ............................................. F02K 9/00
[52] U.S. Cl. ........................... 60/258; 60/211; 60/257; 239/404; 239/543
[58] Field of Search ........................... 60/211, 252, 257, 60/258; 239/399, 403, 404, 543, 544

[56] References Cited

U.S. PATENT DOCUMENTS

| | | | |
|---|---|---|---|
| 2,602,290 | 7/1952 | Goddard | 60/257 |
| 3,568,445 | 3/1971 | Munding et al. | 60/258 |
| 3,640,072 | 2/1972 | Kayser | 60/258 |
| 5,080,286 | 1/1992 | Morrison | 239/543 |

*Primary Examiner*—Charles G. Freay
*Attorney, Agent, or Firm*—Hugh P. Nicholson; Freddie M. Bush

[57] ABSTRACT

Current state-of-the art injection methodologies for bipropellant engines rely on either impingement or turbulence to mix the fuel and oxidizer streams. The multiple impinging stream vortex injector combines both mixing schemes into a single injector. Both first stage mixing at point of impingement and second stage mixing or turbulent vortex mixing is accomplished by impinging momentum balanced, tangentially injected propellant streams onto one another. The impingement angles are calculated to yield a resultant stream vector that consists of only a tangential velocity component. The two stages of mixing results in increased engine performance and combustion efficiency.

1 Claim, 3 Drawing Sheets

MULTIPLE IMPINGING STREAM VORTEX INJECTOR

DEDICATORY CLAUSE

The invention described herein may be manufactured, used, and licensed by or for the Government for governmental purposes without the payment to us of any royalties thereon.

BACKGROUND OF THE INVENTION

Current state-of-the art injection methodologies for bipropellant engines rely on either impingement or turbulence to mix the fuel and oxidizer streams. With impinging stream injectors, the fuel and oxidizer streams are directed towards one another at various impingement angles. The impingement angles are determined from a momentum balance of the incoming jets. The high velocity streams come in direct contact with one another, break up, mix, and hypergolically ignite. The vortex injector, on the other hand, creates turbulence generated from high velocity, non-impinging fuel and oxidizer streams injected tangentially into the combustion chamber. The tangentially injected streams generate a highly turbulent vortex that mixes the propellants and allows hypergolic ignition to occur.

SUMMARY OF THE INVENTION

The multiple impinging stream vortex injector of this invention combines both mixing schemes into single injector. Both impingement and turbulent mixing is accomplished by impinging momentum balanced, tangentially injected propellant streams onto one another. The impingement angles are calculated to yield a resultant stream vector that consists of only a tangential velocity component. The two stages of mixing result in increased engine performance and combustion efficiency.

The fuel and oxidizer propellants are fed into their respective orifices. Initial combustion of the propellants occurs with the first stage of mixing at the impingement point. The resultant propellant stream consists only of a tangential velocity component. Complete mixing and combustion of the propellants is achieved by the turbulent vortex created by the resultant stream. The impinging stream vortex injector can be utilized in any propulsion system that necessitates the use of bipropellant gels and/or liquids.

DESCRIPTION OF THE PREFERRED EMBODIMENT(S)

The multiple impinging streams vortex injector of this invention utilizes impingement and turbulence mixing schemes in a single injector. Both impingement and turbulent mixing is accomplished by impinging momentum balanced, tangentially injected propellant streams onto one another. The impingement angles are calculated to yield a resultant stream vector that consists of only a tangential velocity component. The two stages of mixing results in increased engine performance and combustion efficiency.

Figure 1:
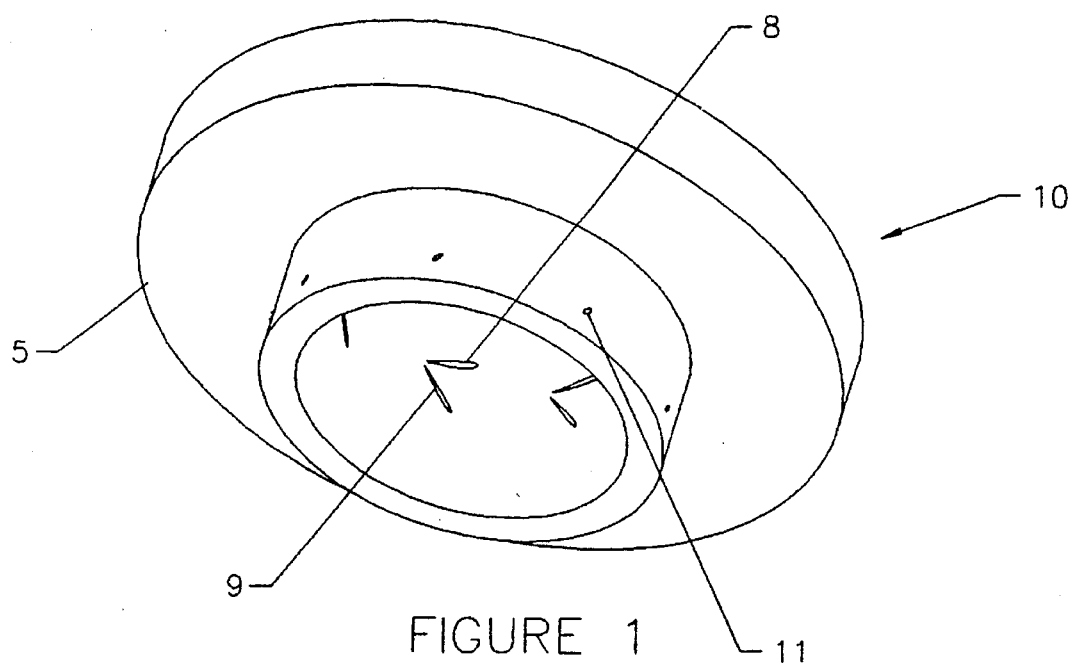
FIG. 1 is an isometric view of the injector.
Figure 2:
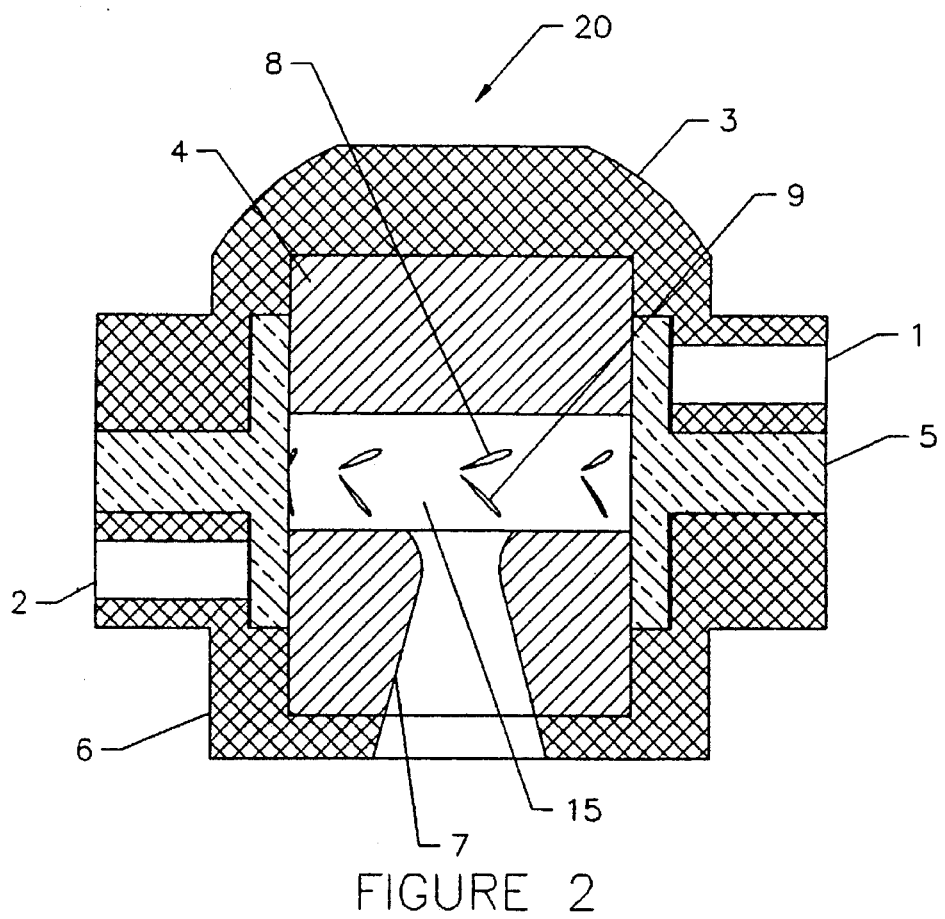
FIG. 2 is a cross-section view of the engine assembly.
Figure 3:
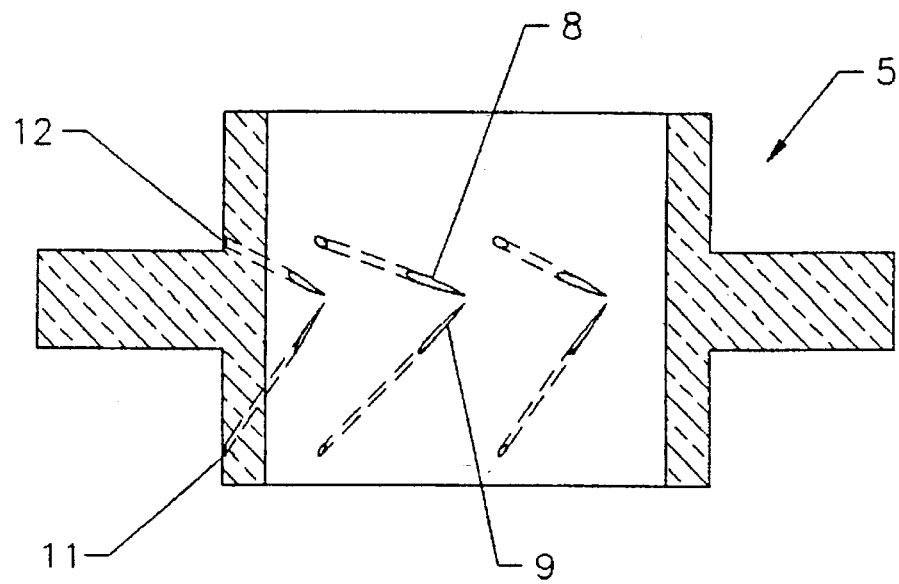
FIG. 3 is a cross-section view of the injector.

In further reference to the Figures of the Drawing, FIG. 1 depicts an isometric view of the injector 10 comprising an injector body 5, an oxidizer injector orifice outlet 8, a fuel injector outlet 9, and a fuel injector orifice inlet 11. The oxidizer injector orifice inlet 12 is located on the opposite side from the fuel injector orifice inlet 11 as shown by view depicted in FIG. 1; hence, the oxidizer injector orifice inlet 12 is best illustrated as shown in FIG. 3. The oxidizer injector orifice inlet is in communication with the oxidizer manifold inlet 1 as shown in FIG. 2, the cross-sectional view of the engine assembly 20. The fuel manifold inlet 2 of FIG. 2 supplies all the fuel injector orifice outlets (illustrated as 9 in FIG. 1, FIG. 2, and FIG. 3) by way of a fuel injector orifice inlet 11 shown extending through the injector body 5 as illustrated in the cross-sectional view of the injector body 5. Likewise, oxidizer manifold inlet 1 of FIG. 2 supplies all the oxidizer injector orifice outlets (illustrated as 8 in FIG. 1, FIG. 2, and FIG. 3) by way of an oxidizer injector orifice inlet 12 shown extending through the injector body 5, also illustrated in the cross-sectional view of the injector body 5.

In further reference to FIG. 2 which depicts a cross-sectional view of the engine assembly 20, a head closure 3, a face plate 4, and an aft closure 6 comprise the separate parts of the engine assembly which are secured together by welding or other securing techniques well established in the art. A nozzle throat 7 is shown extending from combustion chamber 15 of FIG. 2. Although only one oxidizer injector orifice outlet 8 and only one fuel injector orifice outlet 9 are shown in FIG. 1, FIG. 2, and FIG. 3, other oxidizer injector orifice outlets are supplied by way of a separate oxidizer injector orifice inlet 12 extending through the injector body as illustrated in FIG. 3. Likewise, other fuel injector orifice outlets are supplied by way of a separate fuel injector orifice inlet 11 extending through the injector body as illustrated in FIG. 3.

Figure 4:
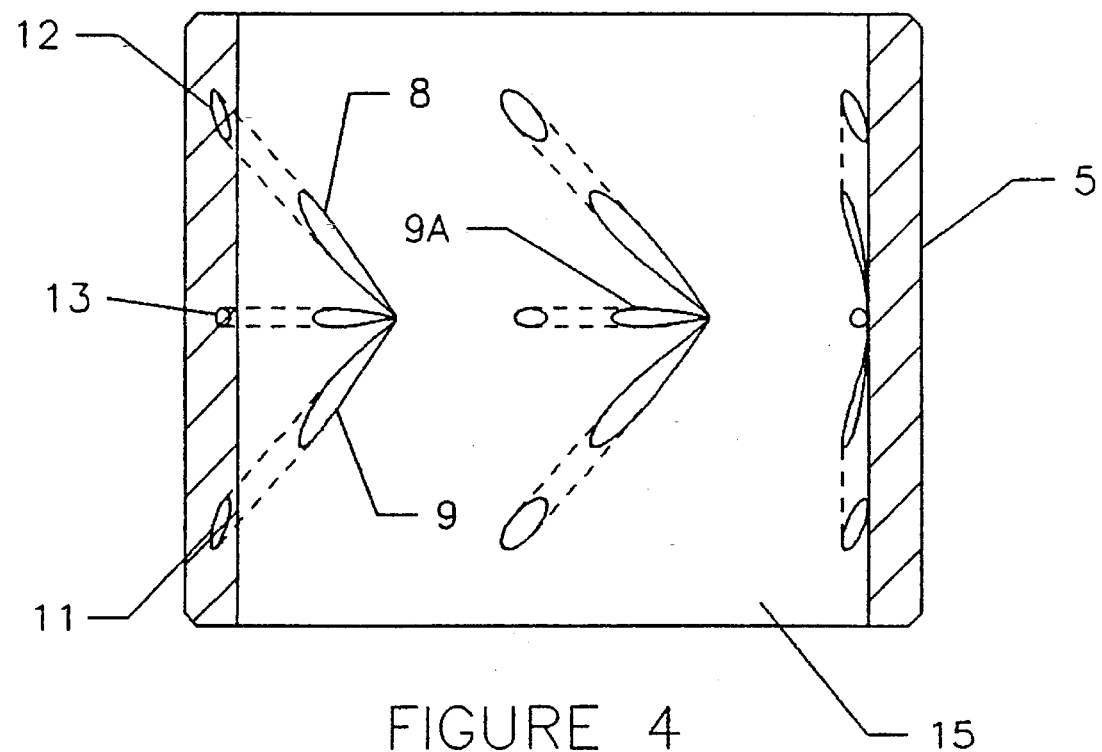
FIG. 4 depicts triple impinging streams of propellant with hidden lines to show propellant feed streams in combustion chamber.
Figure 5:
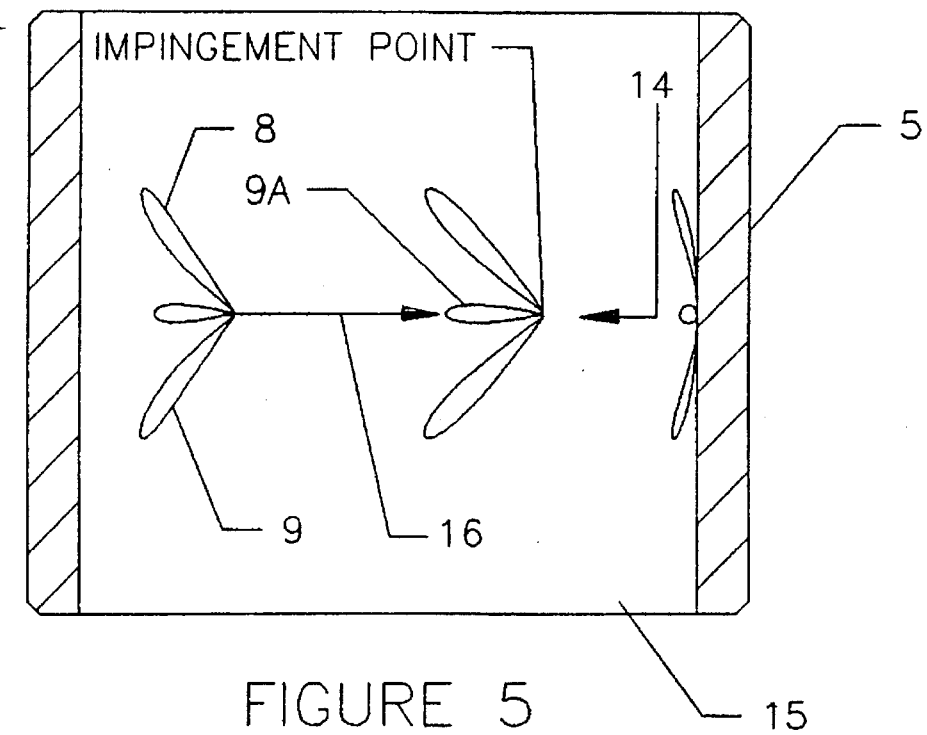
FIG. 5 illustrates impingement point and resultant vector in combustion chamber.

FIGS. 4 and 5 illustrate a triple impinging streams of propellants, impinging point, and resultant vector in combustion chamber respectively. (vortex mixing 14 takes place after impingement point), Like numbers identify like parts as shown in previously identified Figures. The additional fuel outlet 9A, resultant vector 16, and area of vortex mixing 14 are shown in FIG. 5. Also the propellant streams can be either oxidizer and/or fuel; however, in the case of FIGS. 4 and 5 elements 13 and 9A are fuel inlets and fuel outlets respectively for the third propellant stream.

Figure 6:
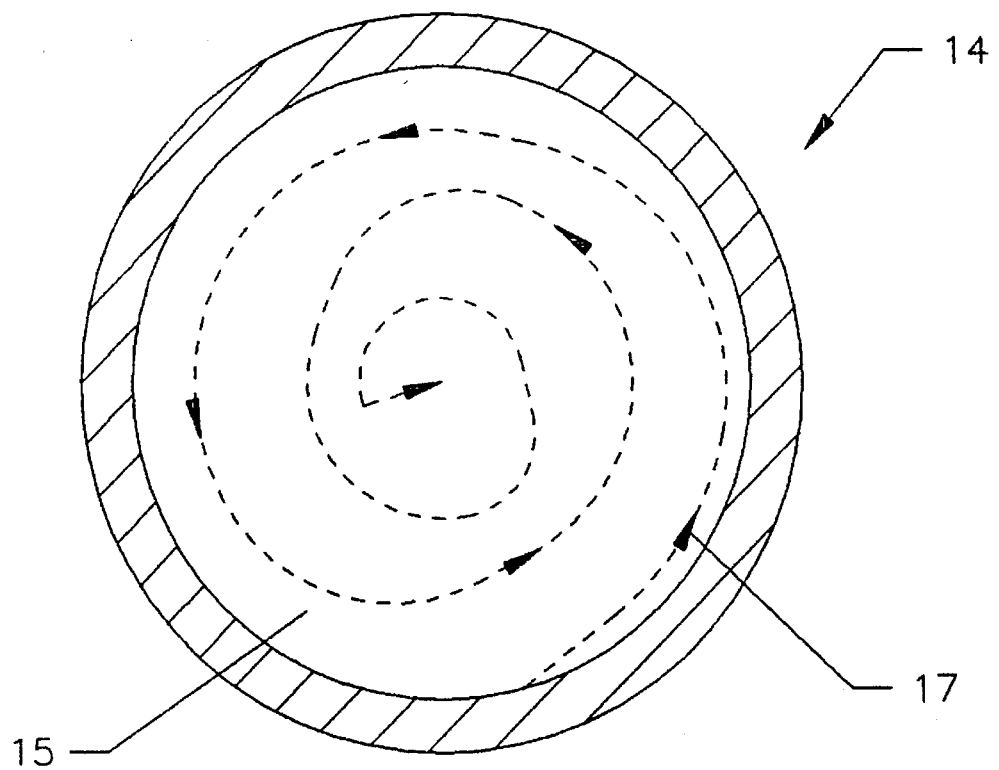
FIG. 6 illustrates the vortex mixing phenomena which takes place in combustion chamber 15 after point of impingement depicted in FIG. 5.

In further reference to FIG. 6, vortex mixing phenomena 14 occurs after impingement point as illustrated in FIG. 5. The typical path which a combustion mass or particle 17 may take after impingement point in the combustion chamber 15 is illustrated by the dashed line. Typically the propellants enter through the orifices, impinge, and swirl around the combustion chamber until exiting through the exhaust nozzle. The two stages of mixing i.e., the point of impingement and vortex mixing, result in increased engine performance and combustion efficiency. Initial hypergolic combustion takes place at first stage of mixing at the impingement point of the propellant oxidizer and propellant fuel. Complete mixing and combustion of the propellant oxidizer and propellant fuel occurs by the turbulent vortex created by the initial hypergolic combustion at first stage of mixing at the impingement point.

Injector Operation

1. The fuel and oxidizer propellants are fed into their respective orifices.

2. Initial combustion of the propellants occurs with the first stage of mixing at the impingement point. The resultant propellant stream consists only of a tangential velocity component.

3. Complete mixing and combustion of the propellants is achieved by the turbulent vortex created by the resultant stream.

Operation of Engine

Oxidizer and fuel are injected by conventional system control means into inlets 12 and 11 by means of inlet passages 1 and 2. The oxidizer and fuel are then injected tangentially into the combustion chamber via injector orifice outlets 8 and 9, respectively, where they impinge and ignite hypergolically. Combustion continues as they swirl through the combustion chamber and out the nozzle.

The angles of injection for the oxidizer and fuel are a function of the propellant mixture ratio, propellant mass flow rates, and propellant injection velocities. These parameters are specified by the designer.

The material and configuration of each component of the engine assembly in FIG. 2 is arbitrary and is driven by the missile system requirements.

Potential Applications

The multiple impinging stream vortex injector can be utilized in any propulsion system that necessitates the use of bipropellant gels and/or liquids.

We claim:

1. A multiple impinging stream vortex injector in combination with an engine assembly comprising:

(i) an injector body secured within an engine assembly which is comprised of a head closure, a face plate, an aft closure, and said injector body, said injector body, said head closure, said face plate, and said aft closure secured together to form an engine assembly having said injector body as a central, integral part of said engine assembly;

(ii) a combustion chamber and an exhaust nozzle with a throat portion extending in a perpendicular direction from said combustion chamber for discharging combustion gases, said combustion chamber and said nozzle and throat portion defined by said face plate and said injector body;

(iii) an oxidizer manifold inlet in communication with a plurality of oxidizer orifice inlets, each of said oxidizer inlets connected to a separate channel extending through said injector body and terminating with oxidizer injector orifice outlets in said combustion chamber, each of said oxidizer orifice outlets functioning to inject a liquid propellant oxidizer at an angle of injection to provide an impinging tangential velocity component with a liquid propellant fuel injected simultaneously at an angle of injection to provide an impinging tangential velocity component into said combustion chamber in a similar manner to achieve first stage mixing at the impingement point of said liquid propellant oxidizer and said liquid propellant fuel; and, (iv) a fuel manifold inlet in communication with a plurality of fuel orifice inlets, each of said fuel inlets connected to a separate channel extending through said injector body and terminating with fuel injector orifice outlets in said combustion chamber, said fuel orifice outlets functioning to inject a liquid propellant fuel at an angle of injection to provide an impinging tangential velocity component with a liquid propellant oxidizer injected simultaneously at an angle of injection to provide an impinging tangential velocity component in said combustion chamber in a similar manner to achieve initial hypergolic combustion with the first stage of mixing at the impingement point of said liquid propellant oxidizer and said liquid propellant fuel and with complete mixing and combustion of the liquid propellant oxidizer and liquid propellant fuel occurring by a second stage vortex mixing created by said initial hypergolic combustion at said first stage of mixing at said impingement point.

* * * * *